United States Patent
Collin et al.

[11] Patent Number: 5,441,764
[45] Date of Patent: * Aug. 15, 1995

[54] METHOD OF MANUFACTURING A COMPOUND BODY AND THE RESULTING BODY

[75] Inventors: Marianne Collin, Enskede; Bertil Mattsson; Jan Nilsson, both of Robertsfors, all of Sweden

[73] Assignee: Sandvik AB, Sandviken, Sweden

[*] Notice: The portion of the term of this patent subsequent to Feb. 8, 2011 has been disclaimed.

[21] Appl. No.: 268,740

[22] Filed: Jun. 30, 1994

Related U.S. Application Data

[63] Continuation of Ser. No. 833,162, Feb. 10, 1992, abandoned.

[30] Foreign Application Priority Data

Feb. 8, 1991 [SE] Sweden .................... 9100396

[51] Int. Cl.$^6$ .................................. B05D 3/12
[52] U.S. Cl. ................................. 427/226; 427/294
[58] Field of Search ................. 427/180, 226, 294

[56] References Cited

U.S. PATENT DOCUMENTS

| | | | |
|---|---|---|---|
| 3,697,261 | 10/1972 | Jump et al. | 75/208 R |
| 3,710,953 | 1/1973 | Kirsch | 294/64 |
| 4,339,271 | 7/1982 | Isaksson et al. | 75/223 |
| 4,455,353 | 7/1984 | Bruce | 419/27 |
| 4,478,789 | 10/1984 | Adlerborn | 419/49 |
| 4,503,010 | 3/1985 | Kippenberg et al. | 419/27 |
| 4,505,871 | 3/1985 | Adlerborn et al. | 264/325 |
| 4,507,262 | 3/1985 | Karas et al. | 427/180 |
| 4,550,034 | 10/1985 | Shimrock et al. | 427/243 |
| 4,680,199 | 7/1987 | Vontell et al. | 427/204 |
| 4,717,535 | 1/1988 | Adlerborn et al. | 419/38 |
| 4,778,650 | 10/1988 | Hermansson et al. | 419/38 |
| 4,793,968 | 12/1988 | Mosser et al. | 428/550 |
| 4,849,253 | 7/1989 | Maricle et al. | 427/115 |
| 4,853,101 | 8/1989 | Hruska et al. | 427/243 |
| 4,883,639 | 11/1989 | Adlerborn et al. | 419/49 |
| 4,987,105 | 1/1991 | Wright | 501/96 |
| 5,073,405 | 12/1991 | Vasilow et al. | 427/105 |
| 5,080,843 | 1/1992 | Larker et al. | 264/62 |
| 5,082,710 | 1/1992 | Wright | 428/76 |
| 5,089,197 | 2/1992 | Butler et al. | 264/65 |
| 5,284,616 | 2/1994 | Mattsson et al. | 419/44 |

FOREIGN PATENT DOCUMENTS

92/11107 7/1992 WIPO .

Primary Examiner—Shrive Beck
Assistant Examiner—Katherine A. Bareford
Attorney, Agent, or Firm—Burns, Doane, Swecker & Mathis

[57] ABSTRACT

According to the present invention there is provided a method of manufacturing a compound body having at least one, partly covering layer on a porous body, whose pore system is evacuate by means of a subpressure which is applied on the porous body by a suction cup or the like and the body is dipped in a slurry of powdery components of the layer. The compound body is densified by sintering or other heat treatment, e.g., post-HIP.

18 Claims, 1 Drawing Sheet

METHOD OF MANUFACTURING A COMPOUND BODY AND THE RESULTING BODY

This application is a continuation of application Ser. No. 07/833,162, filed Feb. 10, 1992, now abandoned.

BACKGROUND OF THE INVENTION

The present invention relates to a method of manufacturing a compound body with a layer by applying a low pressure to the body in a porous state while dipping the body into a slurry of components of the layer material, whereafter the compound body is heat treated, e.g., by sintering.

In order to increase the wear resistance of a body exposed to wear without losing toughness, the body is often coated with a wear resistant layer. Such is the case for inserts for machining where one or more layers are applied using CVD- or PVD-technique. Layers deposited in this way are usually single phase and a suitable thickness is some ten microns. A limitation with such layers is that it is difficult to combine fine grain size, thick layers and good adhesion.

Applying a layer onto porous bodies by dipping is a suitable production method. This, however, leads often to problems with bubbling and blistering and an incompletely covering layer. The bubbling and blistering is due to the pore system in the body and is accentuated by coarse and/or unevenly distributed pores. A particularly unfavorable pore system is found in materials containing fibers and/or needle and/or plate-like single crystals.

When isostatically pressing a porous body, the body is usually enclosed in a dense enclosure in order to prevent the pressure medium from penetrating into the pore system of the body. The enclosure is usually a glass or a material which forms a glass at the heating temperature, which is applied in powder form. In order to avoid penetration of the glass into the pores of the body and/or its reaction with the same during the isostatic pressing, one or several intermediate layers are applied which acts as barrier or protective layers. After completion of the isostatic pressing, the glass as well as the intermediate layers are removed. The intermediate layers are generally applied by dipping the body into a slurry of components included in the layer material. However, due to bubbling and blistering during the dipping there are often hollows in the intermediate layer. Swedish patent application SE 9004134-4 discloses an improved method of applying such layers by dipping the body in a slurry of powdered material included in the layer whereby a subpressure is obtained in the porous body by at least one suction cup.

OBJECTS AND SUMMARY OF THE INVENTION

It is our object of this invention to avoid or alleviate the problems of the prior art.

It is also an object of this invention to provide an improved method for providing a layer on a porous body.

Another object of this invention is to provide an improved method for providing a protective layer on a fiber-reinforced body suitable for isostatic pressing.

In one aspect of the invention, there is provided a method of manufacturing a compound body in which at least one, at least partly-covering, layer is applied onto a porous body comprising applying a subpressure to the porous body while the body is dipped in a slurry of powdery components of the layer, and densifying the dipped body by heat-treatment as well as the resulting body.

BRIEF DESCRIPTION OF THE DRAWING

The invention is illustrated in FIG. 1 which is a light optical micrograph (300×) of a ceramic body coated with $Al_2O_3$ according to the invention.

DETAILED DESCRIPTION OF THE PREFERRED EMBODIMENTS OF THE INVENTION

Figure 1:
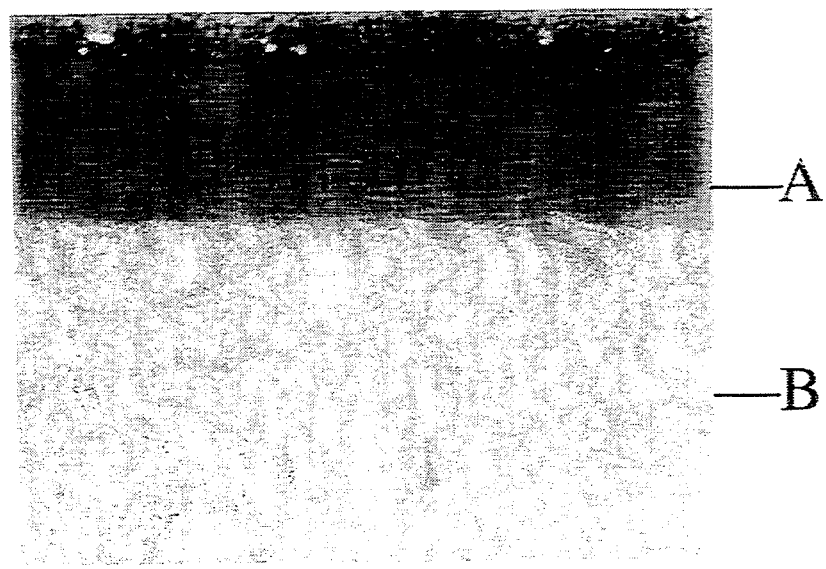

According to the invention, there is now provided a method for manufacturing a compound body characterized in that at least one, at least partly-covering, layer is applied to a porous body. The porous body is evacuated by means of a subpressure applied on an external surface of the body with the aid of one or more suction cups or similar device and a vacuum pump connected thereto while dipping the body in a slurry of powdered materials included in the layer. Any suitable subpressure (that is, pressure below atmospheric and approaching vacuum) can be used and the pressure can be adjusted by known techniques for any particular layer composition. The vacuum pump is a conventional pump. If several layers are included, the body is, of course, dipped several times with or without intervening drying in order to obtain the desired layer combination and/or thickness. The method is particularly suited for the coating of porous, powder metallurgically manufactured bodies in either the compacted, presintered or sintered state, particularly with multi-phase, fine-grained layers. In order to preserve the fine-grained structure, grain growth inhibitors can easily be added. After application of the layer, the body is densified by sintering, HIP (hot isostatic pressing), gas pressure sintering or other heat treatment. The body obtained hereby is either still porous or essentially completely dense. The applied layer can during sintering/heat treatment react with the body and amore or less sharp transition zone is obtained.

The slurry of powdered materials is prepared by dispersing 2–50%, preferably 5–30%, by volume of the powdered material of a grain size 0.1–100 μm in a liquid (alcohol, ketone, hydrocarbon, water or a mixture of two or more of these). For cutting tool applications, the grain size should preferably be 0.1–5 μm. In order to obtain a good deagglomeration and a stable, dispersion, suitable known organic surface active compounds are added. Organic compounds can also be added in order to give the dispersion optimum viscosity and to give good strength to the applied layer. If water is used as dispersing medium, the pH-value has to be adjusted in such a way that it preferably is well above or well below the zeta-potential of the powdered material. If a coating is desired consisting of several layers with different composition, a suspension for each composition is made.

The dipping is repeated until desired thickness and composition is obtained. The thickness of the layer depends on the application. After dipping, the layer is dried. The drying can be accelerated by, e.g., a hot air fan. It is important to adjust the drying rate so that the layer does not crack. Often, one or more additional drying steps between the dippings are required. The organic compounds are driven off either in a separate evaporation step or during the subsequent sintering.

The method according to the invention is suitable for coated cutting inserts made of, e.g., ceramics, cemented carbides, titanium based carbonitride alloys, so-called cermets, etc. Hereby, a more wear resistant layer is applied on top of a more tough core, e.g., single phase layers such as TiC, TiN and/or $Al_2O_3$ or preferably, multi-phase layers such as gamma-phase containing cemented carbide layers on a core of only WC—Co cemented carbide or a layer of fine-grained cemented carbide on a more coarse-grained cemented carbide. The wear resistant layer can also contain particles of diamond or other wear resistant materials. Other possibilities are applying layers of WC and/or gamma phase and/or cobalt on ceramic bodies, preferably $Al_2O_3$-based. The thickness of the layer should preferably be <50 μm, most preferably 5–15 μm.

Another alternative is to apply layers that are chemically more stable than the body such as an $Al_2O_3$-layer on a SiC body.

Yet another alternative is to apply layers that gives the coated body more suitable frictional properties higher as well as lower. For example, a porous body of $Si_3N_4$ doped with $Y_2O_3$ can be coated with a layer of the same material including hexagonal BN to obtain lower friction or with a layer of the same material including SiC to obtain higher friction.

Yet another alternative is to apply layers that have different electrical properties, such as an electrical conductivity different from that of the body, For example, a porous body of $TiB_2$ and $Si_3N_4$ can be coated with a layer of TiN, $Si_3N_4$, and $Y_2O_3$ to obtain an insulating layer on a conductive core.

The layer material shall preferably be chosen with a coefficient of thermal expansion that is lower than the coefficient of the body in order to obtain compressive prestresses in the layer.

The method is particularly suitable for applying layers on materials preferably for cutting tools that are reinforced with whiskers, fibers and/or platelets, e.g., an $Al_2O_3$-layer on an $Al_2O_3$-material reinforced with SiC-whiskers. The layer is thereby applied on the material in presintered condition and thereafter sintered, preferably by isostatic sintering. A certain shaping of the presintered material before coating can be used in order to counteract form changes which occur during the isostatic sintering. In particular, for tool pressed parts it may be necessary to remove material which during the compaction has been sheared against the die and has obtained a substantial orientation of the whisker material.

The method according to the invention can also be applied to materials which cannot be sintered to closed porosity by conventional sintering and therefore have to be isostatic sintered using a gas pressure transmitting medium. A first layer is then applied by dipping during subpressure. During the densification process, this layer at least partly reacts with the material in the porous body or in other ways forms an adhering layer which is not removed after finished densification. Thereafter, at least one intermediate layer is applied by dipping and after that a cover of glass (or material which forms a glass when heated) is applied in powder form. This enclosure is made impenetrable for the pressure medium by heating. The body is then compacted to an essentially dense body by isostatic pressing and sintering whereafter said intermediate layer and the glassy enclosure is removed, resulting in a coated body.

According to the method of the invention, coated bodies with thicker layers than what is possible and reasonable in known ways can also be manufactured. The method is also convenient from a production point of view and it gives possibility to the manufacture of a fine-grained layer with good adhesion and multi-phase composition. For bodies with an unfavorable pore system, coatings manufactured according to the invention can be advantageous because the slurry with fine-grained material can penetrate into the agglomerate pores, see FIG. 1 in which A is the $Al_2O_3$-layer and B is the ceramic body. In such a way, the occurrence of flaws originating from agglomerate pores in the surface region of the sintered material will be reduced.

The present method for the manufacture of a compound body is also suitable for producing ceramic fiber composites, preferably inserts for machining with or without a preformed chip breaker with high relative density without using sophisticated methods such as hot pressing (HP), or hot isostatic pressing (HIP) with glass encapsulation. Ceramic fiber composites with high amount of fibers, whiskers and/or platelets cannot be densely sintered without the use of high pressure because they effectively counteract densification by forming a network. In the method according to the invention, an even, crack-free layer of densely packed particles is made by dipping of compacted or presintered bodies in a particle slurry with water, cyclohexane or other solvent. Because of the high density of particles in the surface, a dense surface layer is obtained after sintering, preferably under vacuum, which now only contains closed porosity and can be densified by a hot isostatic pressing, the so-called post-HIP-treatment, without having to apply further layers. It has turned out that dipping without subpressure in various particle slurries does not give sufficient quality of the applied layer and insufficient densification is obtained at a subsequent post-HIP-treatment.

The invention is additionally illustrated in connection with the following Examples which are to be considered as illustrative of the present invention. It should be understood, however, that the invention is not limited to the specific details of the Examples.

EXAMPLE 1

Three die pressed cemented carbide inserts (SNGN 1204-style) were manufactured in three different ways and compared technologically. The cemented carbide had the composition 5.5% by weight Co, 8.6% by weight TiC+TaC+NbC and rest WC.

Insert 1 was gas pressure sintered at 1400° C. and 10 MPa in Ar-atmosphere. The insert was finished by edge treatment to 30 μm edge radius.

Insert 2 was gas pressure sintered in the same way as insert 1 and was then given an edge rounding to 30 μm. It was thereafter coated by CVD with 1–2 μm TiC and 6–7 μm $Al_2O_3$.

Insert 3 was sintered to 70% relative density and was thereafter given an edge rounding of 30 μm. After that an about 30 μm thick $Al_2O_3$-layer on the insert was applied with aid of the dipping technique according to the invention using a subpressure of 300 mbar. The $Al_2O_3$-coated insert was gas pressure sintered in the same way as insert 1 and 2. In this way a thicker, about 15 μm, and more fine-grained $Al_2O_3$-layer was obtained.

The three inserts were compared with respect to life in case hardened steel (SS2511) with the following result:

Insert 1 (no layer) obtained as expected a severe wear already at low cutting speeds and was therefore tested only at 200 m/min. The wear life was 4 minutes.

Inserts 2 (CVD-coated $Al_2O_3$) and 3 (coated according to the invention) were tested at 500 m/min. Hereby insert 2 obtained wear life of 7 minutes and insert 3 obtained wear life of 11 minutes.

EXAMPLE 2

Three tool pressed ceramic inserts of 25 weight-% SiC-whiskers, balance $Al_2O_3$ were manufactured in three different ways and compared later in technological testing.

Insert 1 was presintered at 1300° C. in a $H_2$-atmosphere and was then ground peripheral in such a way that about 100 μm material was removed around the insert. Protective layers were applied and the insert was densified using glass encapsulated HIP according to previously mentioned Swedish patent application SE 90 04134-4. The protective layers and the glass encapsulation were removed and the insert was edge rounded to about 30 μm.

Insert 2 was presintered and peripheral ground in the same way as insert 1 and edge rounded to about 30 μm. Thereafter, an about 10 μm thick layer consisting of 25% TiC and rest $Al_2O_3$ was applied by dipping technique of the present invention. Application of protective layers, densification and the removal of protective layers and the glass encapsulation were performed in the same way as for insert 1. The finished insert had a TiC+$Al_2O_3$-layer with about 5 μm thickness.

Insert 3 was manufactured in the same way as insert 2, but the layer was made twice as thick.

The inserts were compared in a turning test in hardened ball bearing steel. Hereby insert 2 obtained twice as long life as insert 1 and insert 3 obtained an additional increase of 50% tool life. Examination of the wear pattern showed that the applied TiC+$Al_2O_3$-layer reduces the crater wear.

EXAMPLE 3

A cemented carbide blank was manufactured in such a way that a core was compacted from cobalt-rich, i.e., tough material (10.2% by weight Co, 5.8% by weight TiC+TaC+NbC and rest WC). The blank was presintered to 70% relative density, whereafter a 150 μm thick layer of a more Co poor material (7.2% by weight Co, 5.8% by weight TiC+TaC+NbC and rest WC) was applied by dipping technique of the present invention. On top of a 200 μm thick layer with the composition 2.2% by weight Co, 8.8% by weight TiC+TaC+NbC and rest WC. Everything was gas pressure sintered at 1350° C. and 10 MPa to a dense body.

EXAMPLE 4

$Al_2O_3$ with 29% by volume SiC-whiskers was sintered without pressure, with and without a layer of $Al_2O_3$ applied by dipping. The porous body was dipped in a particle slurry with 20% by weight $Al_2O_3$ and cyclohexane as solvent. Dipping was performed both with and without evacuation of the porous body with the aid of a vacuum pump to a pressure of about 300 mbar. Sintering was performed at 1550° C. in Ar at low pressure and the subsequent post-HIP-treatment at 1550° C. and 200 MPa pressure in Ar.

The results below were obtained shown as % of theoretical density:

|  | After sintering | After post-HIP |
|---|---|---|
| Without layer | <60 | <60 |
| Layer by dipping | ≲60 | <60 |
| Layer with dipping and evacuation | 58 | 99 |

The results show that only the method according to the invention has, after sintering, resulted in a dense surface layer which allows densification to full density at the post HIP-treatment.

EXAMPLE 5

Two tool pressed ceramic inserts consisting of 25 weight-% SiC-whiskers with the rest $Al_2O_3$ were manufactured in two different ways.

Insert 1 was presintered at 1300° C. Protective layers were applied by the dipping technique of the present invention whereafter the insert was densified using glass encapsulated HIP-technique. The HIP-ed insert was ground peripherally and edge rounded to about 30 μm.

Insert 2 was presintered in the same was as insert 1 whereafter an about 30 μm $Al_2O_3$-layer was applied by the dipping technique of the present invention. Application of protective layers, glass encapsulated HIP, peripheral grinding and edge rounding were performed in the same, way as for insert 1. The finished insert had a well adhering 10–15 μm $Al_2O_3$-layer on the rake face as illustrated in FIG. 1.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A method of manufacturing a compound body in which at least one, at least partly-covering, layer is applied onto a porous body comprising applying a subpressure to the porous body by means of a suction cup while the body is dipped in a slurry of powdery components of the layer, and densifying the dipped body by heat treatment, the applied layer being more wear resistant than the porous body, the subpressure being applied to a first external surface of the porous body and the applied layer covering a second external surface.

2. A method of manufacturing a compound body in which at least one, at least partly-covering, layer is applied onto a porous body comprising applying a subpressure to the porous body by means of a suction cup while the body is dipped in a slurry of powdery components of the layer, and densifying the dipped body by heat treatment, the applied layer being more wear resistant than the porous body, the porous body including pores distributed throughout the porous body, the subpressure being applied to a first external surface of the porous body and the applied layer penetrating into pores on a second external surface of the porous body as a result of the subpressure acting on the pores distributed throughout the porous body.

3. The method of claim 1 or claim 2 wherein the porous body is a compacted body.

4. The method of claim 1 or claim 2 wherein the porous body is a presintered body.

5. The method of to claim 1 or claim 2 wherein the porous body is a ceramic containing reinforcing whiskers, fibers and/or platelets.

6. The method of to claim 1 or claim 2 wherein the applied layer is more chemically more stable than the porous body.

7. The method of claim 1 or claim 2 wherein the applied layer has frictional properties different from that of the porous body.

8. The method of claim 1 or claim 2 wherein the applied layer has electrical properties different from those of the porous body.

9. The method of claim 1 or claim 2 wherein the applied layer results in the densified body having compressive stresses on its surface.

10. The method of claim 1 or claim 2 wherein the slurry contains 2–50% by volume of particles with a size of 0.1–100 $\mu$m, a liquid from the group of water, alcohol, hydrocarbon, ketone and mixtures thereof, and compounds added to improve the dispersion, adjust the viscosity of the slurry and/or increase the strength of the layer applied.

11. The method of claim 1 or claim 2 wherein the porous body includes pores in a surface region thereof and the applied layer penetrates into said pores.

12. The method of claim 1 or claim 2 wherein the applied layer comprises $Al_2O_3$.

13. The method of claim 1 or claim 2 wherein the porous body comprises a cutting tool insert.

14. The method of claim 1 or claim 2 wherein the porous body includes pores distributed throughout the porous body.

15. The method of claim 1 or claim 2 wherein the subpressure is applied to an interconnected pore network of the porous body and the applied layer penetrates into said pores.

16. The method of claim 1 or claim 2 wherein the applied layer provides a dense surface layer having a closed porosity.

17. A method of manufacturing a compound body in which at least one, at least partly-covering, layer is applied onto a porous body comprising applying a subpressure to the porous body by means of a suction cup while the body is dipped in a slurry of powdery components of the layer, and densifying the dipped body by heat treatment, the applied layer being more wear resistant than the porous body, the applied layer providing the porous body with a closed porosity and the subsequent heat treatment being a post-hot isostatic pressing-treatment.

18. A method of manufacturing a compound body in which at least one, at least partly-covering, layer is applied onto a porous body comprising applying a subpressure to the porous body by means of a suction cup while the body is dipped in a slurry of powdery components of the layer, and densifying the dipped body by heat treatment, the applied layer being more wear resistant than the porous body, said compound body being densified by isostatic pressing by means of a gaseous pressure transmitting medium whereby on top of said dipped layer is additionally applied at least one intermediate layer by dipping whereafter an enclosure of glass or a material which forms a glass by heating is applied in powder form, after which said enclosure is made impenetrable for the pressure medium by heating, the body is then densified by means of a heat treatment of isostatic pressing and sintering, whereafter said intermediate layer and glassy enclosure is removed.

* * * * *